(12) United States Patent
Murakami et al.

(10) Patent No.: US 11,305,415 B2
(45) Date of Patent: Apr. 19, 2022

(54) FIXING APPARATUS FOR ROBOT, ROBOT, AND ROBOT SYSTEM

(71) Applicant: FANUC CORPORATION, Yamanashi (JP)

(72) Inventors: Wataru Murakami, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 178 days.

(21) Appl. No.: 16/747,805

(22) Filed: Jan. 21, 2020

(65) Prior Publication Data
US 2020/0276717 A1    Sep. 3, 2020

(30) Foreign Application Priority Data

Feb. 28, 2019  (JP) .............................. JP2019-036878

(51) Int. Cl.
*B25J 13/08*     (2006.01)
*B25J 5/00*      (2006.01)
*B25J 9/16*      (2006.01)
*B25J 9/00*      (2006.01)

(52) U.S. Cl.
CPC ............. *B25J 5/007* (2013.01); *B25J 9/0009* (2013.01); *B25J 9/1664* (2013.01); *B25J 9/1669* (2013.01); *B25J 13/089* (2013.01)

(58) Field of Classification Search
CPC ........ B25J 5/007; B25J 9/0009; B25J 9/1664; B25J 9/1669; B25J 13/08; B25J 13/089; G05D 1/0225; G05D 2201/0216; Y02P 90/60
See application file for complete search history.

(56) References Cited

U.S. PATENT DOCUMENTS

| 5,555,763 A | 9/1996 | Takeshita |
| 2018/0222064 A1 | 8/2018 | Nishi |
| 2018/0326576 A1 | 11/2018 | Riedel |
| 2019/0093690 A1 | 3/2019 | Nakayama et al. |

(Continued)

FOREIGN PATENT DOCUMENTS

| CA | 2127186 A1 | 12/1994 |
| EP | 0 636 435 A1 | 2/1995 |
| JP | S61-014880 A | 1/1986 |

(Continued)

OTHER PUBLICATIONS

Japanese Office Action dated Apr. 27, 2021, in connection with corresponding JP Application No. 2019-036878 (9 pp., including machine-generated English translation).

*Primary Examiner* — Dale Moyer
(74) *Attorney, Agent, or Firm* — Maier & Maier, PLLC

(57) ABSTRACT

A fixing apparatus that fixes a robot having a robot main body mounted on a truck to an external structure in a positioning state, the truck being capable of traveling on a floor surface, the apparatus including: a first unit provided in one of the robot and the external structure; a second unit provided in the other of the robot and the external structure; a positioning mechanism that determines relative relation between the truck and the robot, and the external structure by use of the first unit and the second unit; and a lock mechanism that locks the truck and the robot, and the external structure.

16 Claims, 15 Drawing Sheets

(56) References Cited

U.S. PATENT DOCUMENTS

| | | |
|---|---|---|
| 2019/0264721 A1 | 8/2019 | Nakayama et al. |
| 2020/0254607 A1* | 8/2020 | Ejstrup Hansen ..... B25J 9/0009 |

FOREIGN PATENT DOCUMENTS

| | | | |
|---|---|---|---|
| JP | H06-64739 A | 3/1994 | |
| JP | H07-16657 A | 1/1995 | |
| JP | H10-151596 A | 6/1998 | |
| JP | 2004-283946 A | 10/2004 | |
| JP | 2008-036716 A | 2/2008 | |
| JP | 2013-061053 A | 4/2013 | |
| JP | 2016-129923 A | 7/2016 | |
| JP | 2018-118341 A | 8/2018 | |
| JP | 2018-126800 A | 8/2018 | |
| JP | 2019-063878 A | 4/2019 | |
| WO | WO-2010043640 A2 * | 4/2010 | .............. B60L 53/16 |
| WO | WO-2020075886 A1 * | 4/2020 | ................ B25J 5/00 |

* cited by examiner

FIXING APPARATUS FOR ROBOT, ROBOT, AND ROBOT SYSTEM

CROSS-REFERENCE TO RELATED APPLICATIONS

This application claims the benefit of Japanese Patent Application No. 2019-036878, the content of which is incorporated herein by reference.

FIELD

The present disclosure relates to a fixing apparatus for a robot, a robot, and a robot system.

BACKGROUND

There is known a working robot including a moving part that is movable between stations provided on a production line, and a working part that is mounted on the moving part, and performs work in each station (see PTL 1, Japanese Unexamined Patent Application, Publication No. 2018-118341).

SUMMARY

An aspect of the present disclosure is a fixing apparatus that fixes a robot having a robot main body mounted on a truck to an external structure in a positioning state, the truck being capable of traveling on a floor surface, the apparatus including: a first unit provided in one of the robot and the external structure; a second unit provided in the other of the robot and the external structure; a positioning mechanism that determines relative relation between the truck and the robot, and the external structure by use of the first unit and the second unit; and a lock mechanism that locks the truck and the robot, and the external structure.

DETAILED DESCRIPTION

Figure 1:
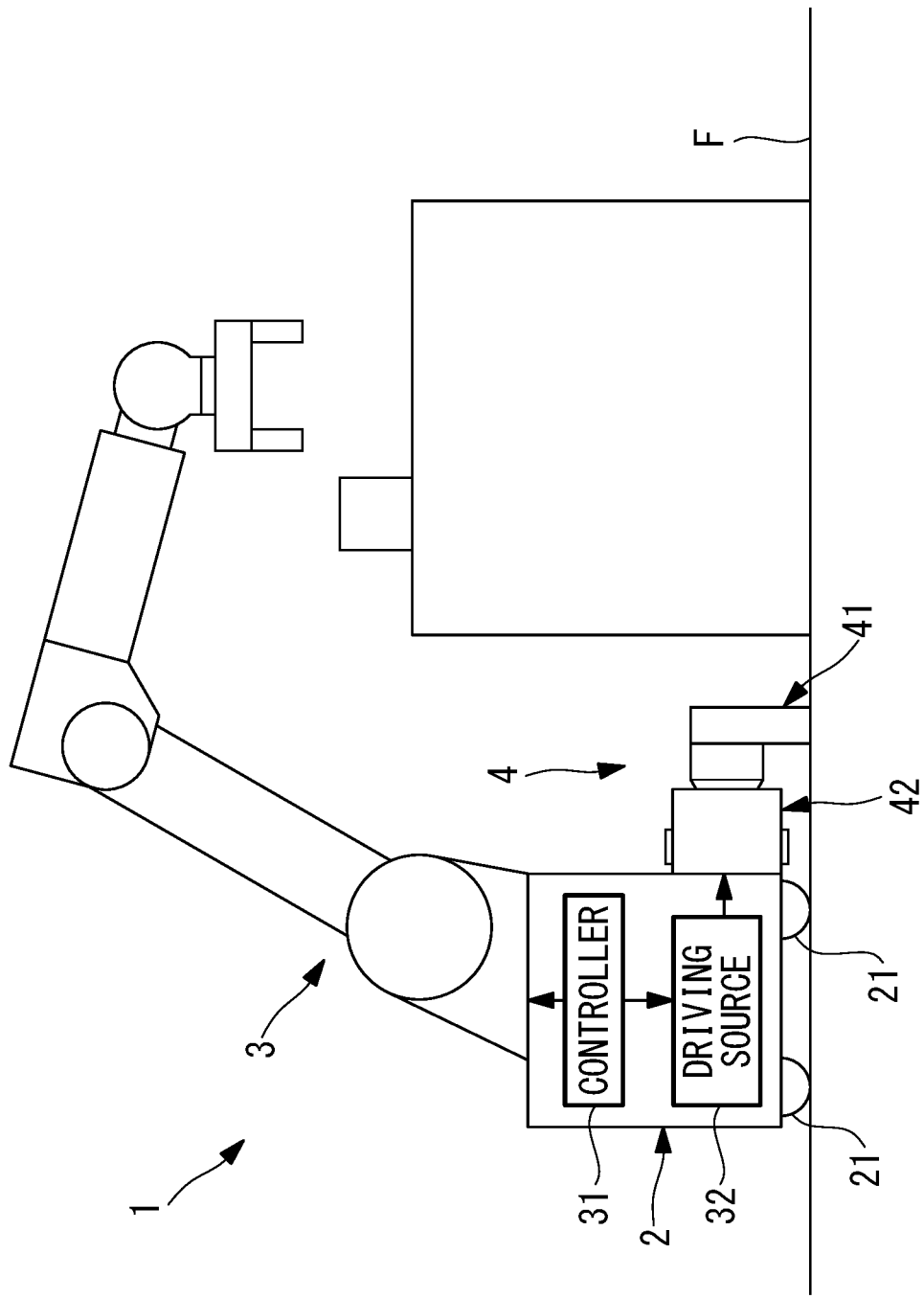
FIG. 1 is a schematic diagram illustrating a movable robot and a fixing apparatus for the movable robot according to an embodiment of the present disclosure.

A movable robot 1 and a fixing apparatus 4 of the movable robot 1 according to an embodiment of the present disclosure will be hereinafter described with reference to the drawings. The movable robot (robot) 1 according to this embodiment includes a truck 2 having wheels 21 capable of traveling on a floor surface F, and a robot main body 3 mounted on the truck 2 as illustrated in FIG. 1.

The truck 2 automatically or manually travels on the floor surface F. The robot main body 3 is, for example, a collaborative robot that shares a workspace with a worker without providing a safety fence, and is, for example, a six-axis articulated type robot. The truck 2 is mounted with a controller 31 of the robot main body 3. The controller 31 operates the robot main body 3 in accordance with a previously taught program.

Figure 2:
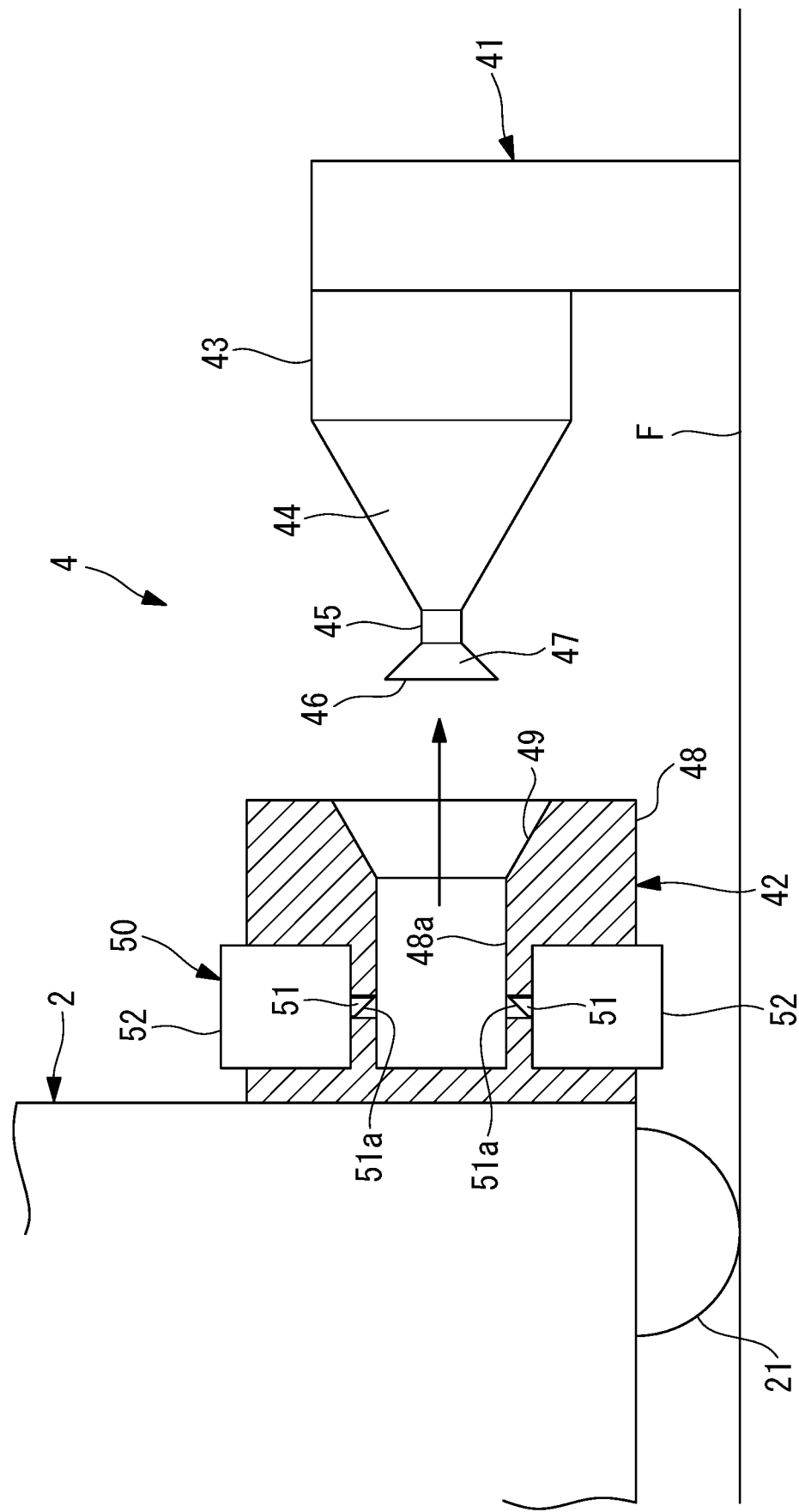
FIG. 2 is a partially longitudinal sectional view illustrating the fixing apparatus of FIG. 1.

The fixing apparatus 4 according to this embodiment includes a first unit 41 installed on the floor surface (external structure) F, and a second unit 42 provided in the truck 2 as illustrated in FIG. 2. The first unit 41 includes a shaft 43 that horizontally extends in a cantilever manner. The shaft 43 is provided with a first circular conical surface (conical surface) 44 tapered toward a tip. Tilted planes tilted in the reverse direction at the same angle on both sides with an axis of the shaft 43 interposed therebetween are composed by the first circular conical surface 44.

The shaft 43 is provided with a columnar part 45 that extends along the axis of the shaft 43 toward the tip with respect to the first circular conical surface 44. The outer diameter of the columnar part 45 is equivalent to the minimum diameter of the first circular conical surface 44. The tip of the columnar part 45 is provided with a disk-like part 46 having a larger diameter than the columnar part 45, and includes a second circular conical surface 47 tapered opposite to the first circular conical surface 44 toward a base end side, on the base end side of the disk-like part 46.

The second unit 42 includes a bracket 48 disposed on a front surface of the truck 2, an inner hole 48a opened toward a tip of the bracket 48, and extending in the front-back direction, and a clamp mechanism (a lock mechanism, a pressing mechanism) 50 provided in the bracket 48. The inner hole 48a of the bracket 48 is sufficiently larger than the outer diameter of the disk-like part 46 of the first unit 41, and the central axis of the inner hole 48a is disposed at a height equivalent to the axis of the shaft 43 of the first unit 41.

A circular conical inner surface (close contact surface) 49 having a shape complementary to the first circular conical surface 44 is provided on a tip of the inner hole 48a of the bracket 48. The clamp mechanism 50 includes a pair of plungers 52 that advance or retreat engagement pieces 51 in the direction intersecting with the central axis of the inner hole 48a of the bracket 48, for example, in the orthogonal direction, at opposite positions with the central axis therebetween.

Figure 5:
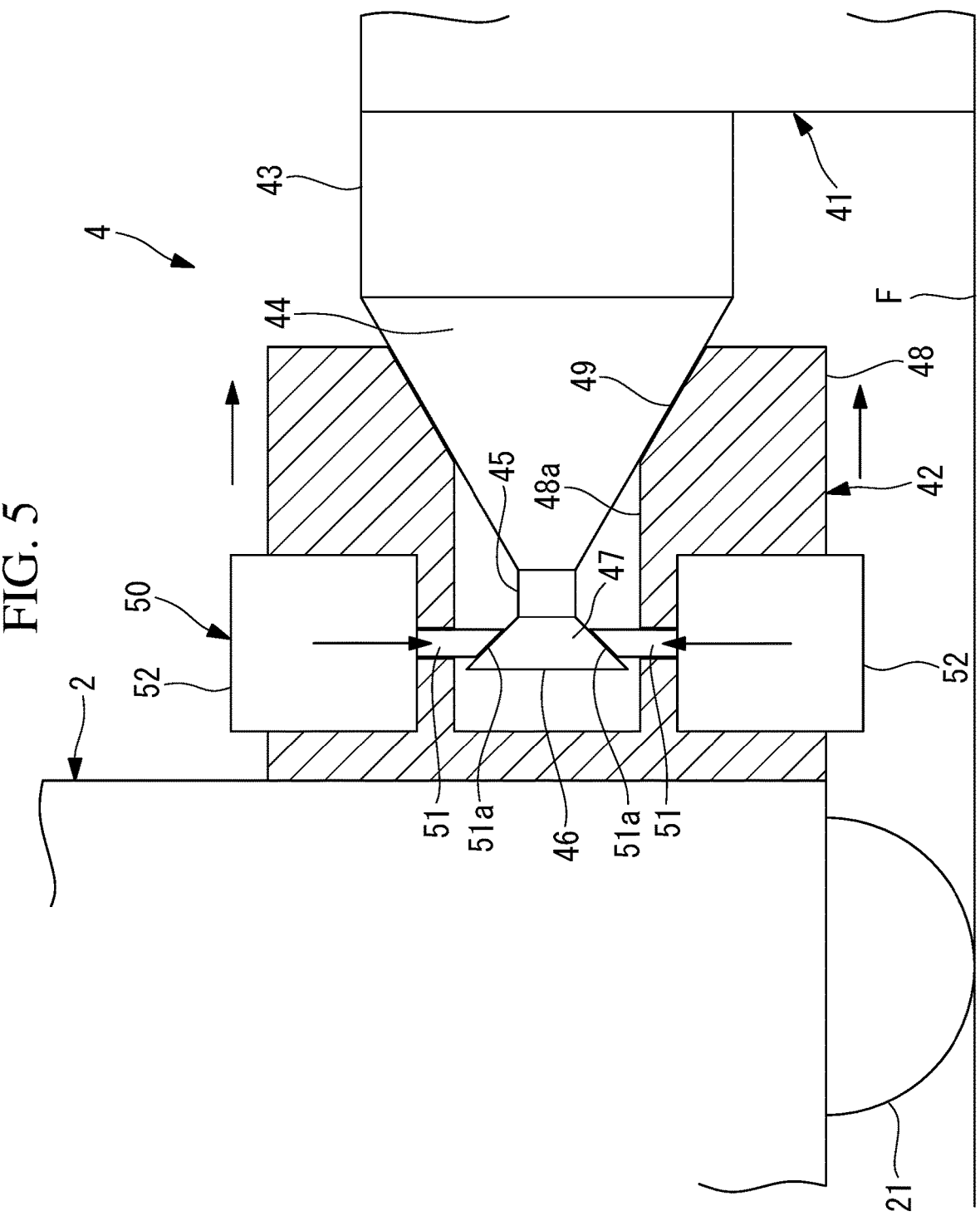
FIG. 5 is a partially longitudinal sectional view illustrating a fixed state in which an engagement piece is further protruded from the state of FIG. 4, and a first circular conical surface and a circular conical inner surface are brought into close contact with each other.

As illustrated in FIG. 2, the plungers 52 can cause the engagement pieces 51 to reciprocate between such a position as to recede radially outward with respect to the inner surface of the inner hole 48a of the bracket 48, and such a position as to protrude radially inward from the inner surface of the inner hole 48a as illustrated in FIG. 5. Power is supplied from a driving source 32 mounted in the truck 2, so that the plungers 52 operate. An arbitrary driving source such as an electric driving source, a hydraulic driving source, and a pneumatic driving source can be used for the driving source 32 for the plungers 52.

Figure 6:
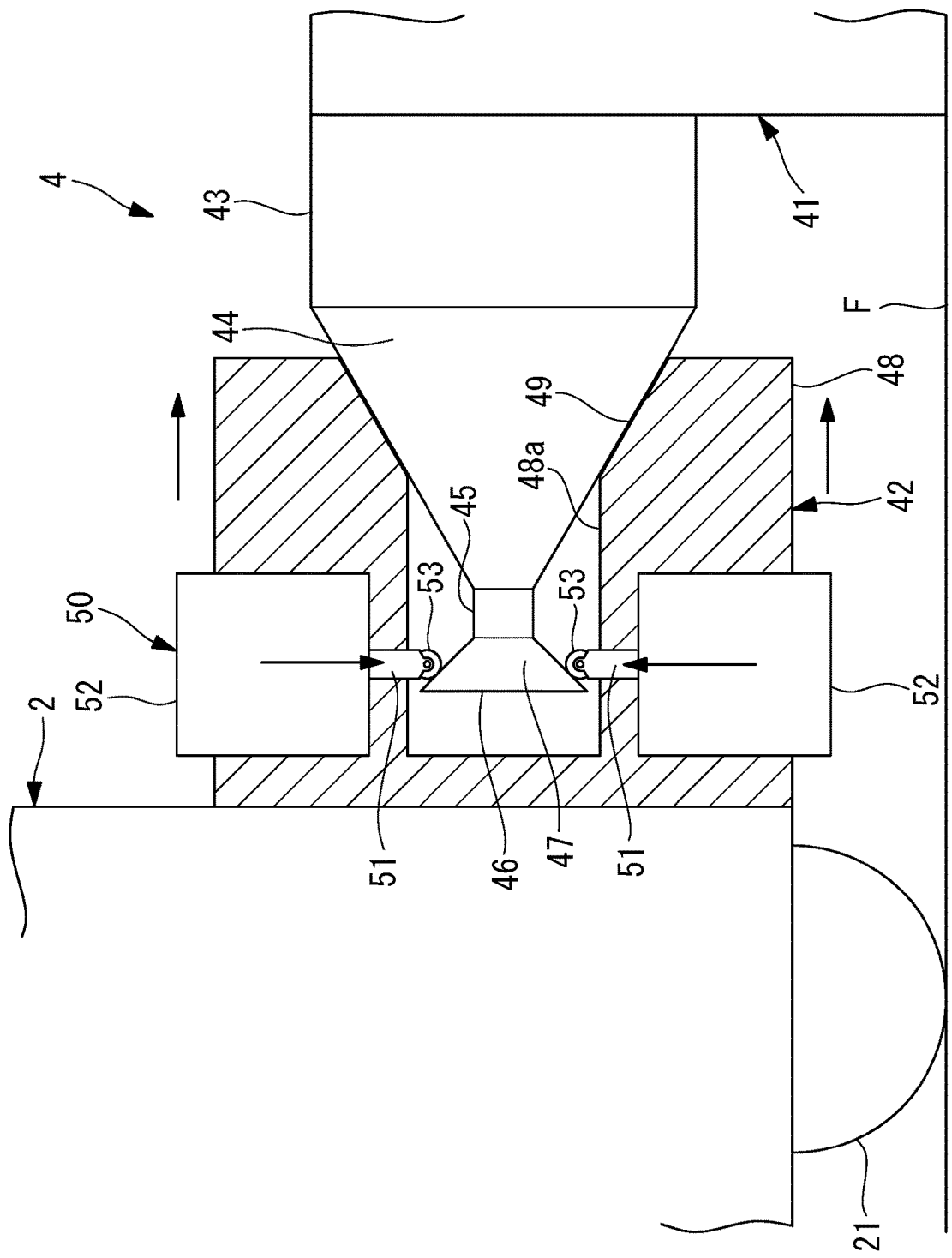
FIG. 6 is a partially longitudinal sectional view illustrating a modification of the engagement piece in FIG. 5.

The plungers 52 are driven by a configuration in which a state of protruding radially inward from the inner surface of the inner hole 48a is maintained (normal closed circuit), when the driving source 32 is interrupted. The engagement pieces 51 may have tilted planes 51a capable of being brought into close contact with the second circular conical surface 47 as illustrated in FIG. 2 to FIG. 5, or may have tips having rollers 53 capable of rolling on the second circular conical surface 47 as illustrated in FIG. 6.

Action of the thus configured movable robot 1 and fixing apparatus 4 for the movable robot 1 according to this embodiment will be described. The truck 2 is operated to travel on the floor surface F, so that the robot main body 3 mounted on the truck 2 can be moved. As illustrated in FIG. 2, the second unit 42 provided on the front surface of the truck 2 is made close to the first unit 41 installed on the floor surface F. At this time, the plungers 52 of the clamp mechanism 50 provided in the second unit 42 are operated, so that the engagement pieces 51 are disposed on the radially outer side with respect to the inner surface of the inner hole 48a of the bracket 48.

The disk-like part 46 in the tip of the shaft 43 of the first unit 41 is made to coincide with a tip opening of the inner hole 48a of the bracket 48 provided in the second unit 42. From this state, the truck 2 is further advanced, so that the shaft 43 of the first unit 41 is inserted into the inner hole 48a of the bracket 48 of the second unit 42 as illustrated in FIG. 3.

Figure 3:
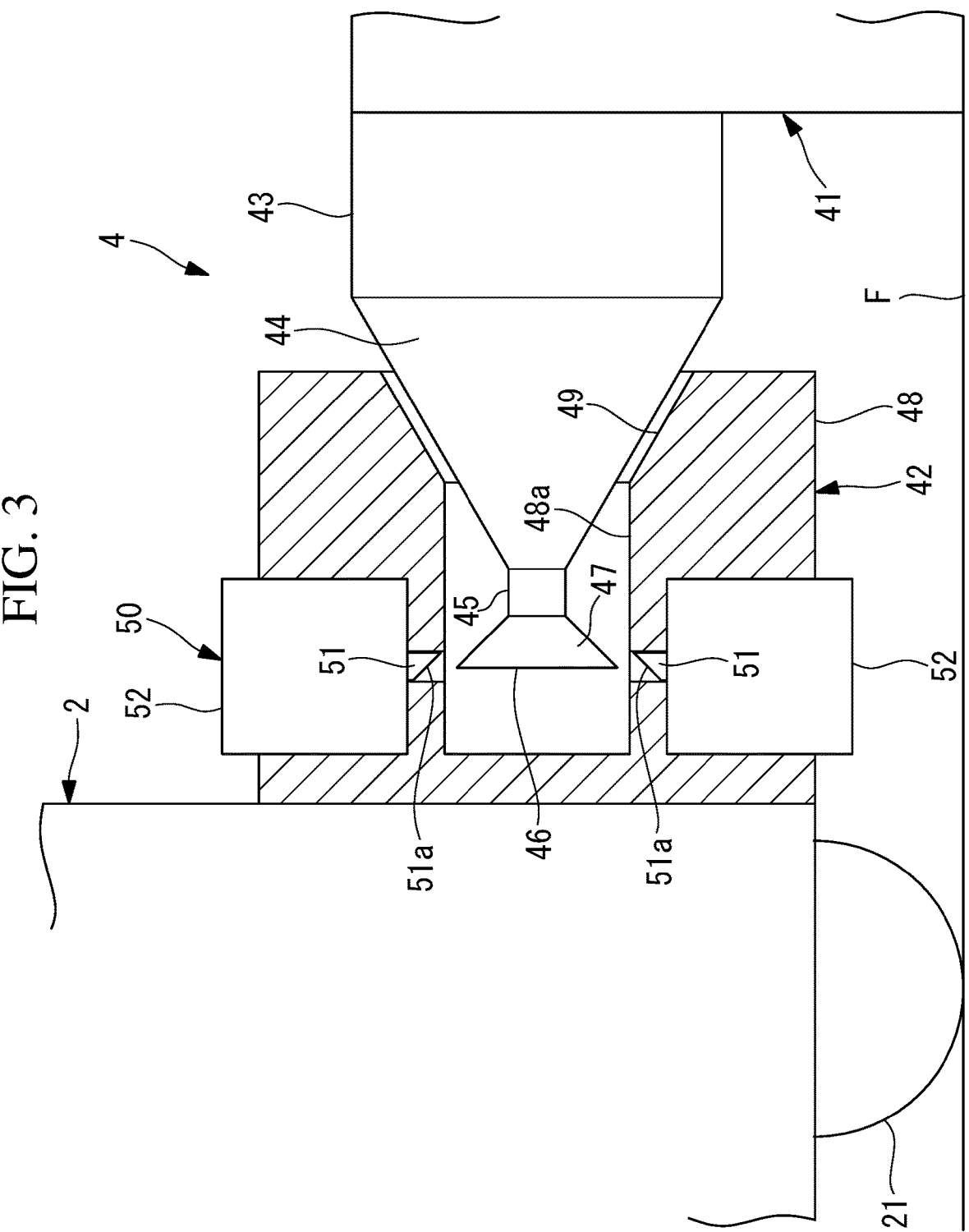
FIG. 3 is a partially longitudinal sectional view illustrating a state in which a tip of a shaft of a first unit of the fixing apparatus in FIG. 2 is inserted into an inner hole of a second unit.

As illustrated in FIG. 3, when the shaft 43 of the first unit 41 is sufficiently inserted into the inner hole 48a of the bracket 48 of the second unit 42, the circular conical inner surface 49 provided in the tip of the inner hole 48a is made close to the first circular conical surface 44 provided in the shaft 43. The plungers 52 of the clamp mechanism 50 are operated in this state as illustrated in FIG. 4, so that when the engagement pieces 51 protrude radially inward from the inner surface of the inner hole 48a, the tilted planes 51a of the engagement pieces 51 are brought into contact with the second circular conical surface 47 provided in the disk-like part 46 in the inner hole.

Figure 4:
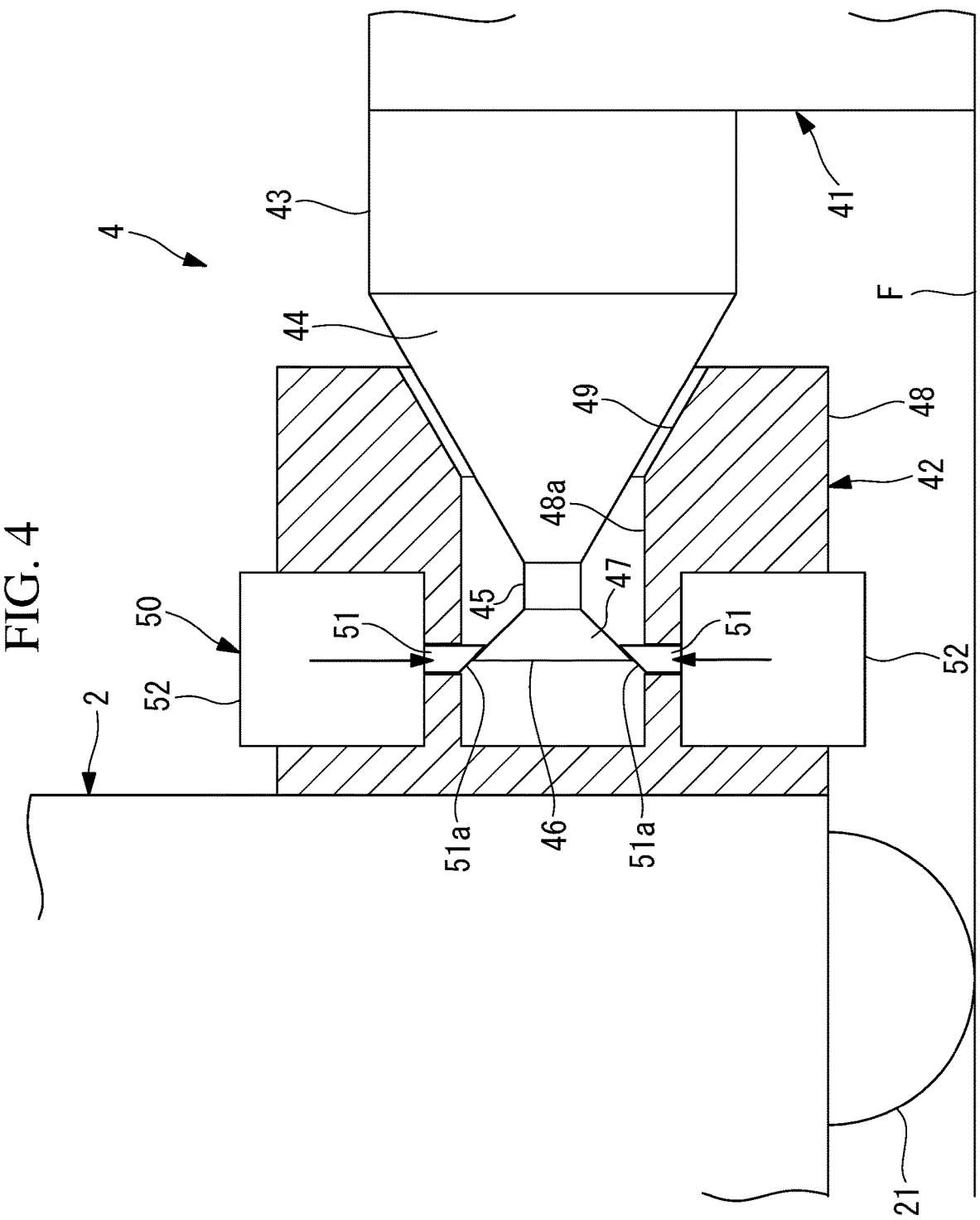
FIG. 4 is a partially longitudinal sectional view illustrating a state in which a clamp mechanism is operated from the state of FIG. 3.

The second circular conical surface 47 has a tilted plane tapered toward a base end side of the shaft 43 from an outer circumference of the disk-like part 46, and therefore when the tilted planes 51a of the engagement pieces 51 protrude radially inward while coming into contact with the tilted planes of the second circular conical surface 47 as illustrated in FIG. 4, component force toward the tip of the shaft 43 from the engagement pieces 51 acts on the second circular conical surface 47. Consequently, the shaft 43 is further drawn into the inner hole 48a of the bracket 48. Then, when the shaft 43 is drawn into the inner hole 48a of the bracket 48, the circular conical inner surface 49 of the bracket 48 comes into contact with the first circular conical surface 44 of the shaft 43, as illustrated in FIG. 5.

The circular conical inner surface 49 of the bracket 48 has the shape complementary to the first circular conical surface 44, and therefore when the circular conical inner surface 49 is made close in the direction of the axis of the shaft 43, the circular conical inner surface 49 and the first circular conical surface 44 are brought into close contact with each other. At this time, external force that acts on the first circular conical surface 44 from the circular conical inner surface 49 acts in the radially opposite direction from the both sides with the axis of the shaft 43 therebetween over the whole circumference around the shaft 43, and therefore is radially offset.

Consequently, the bracket 48 is fixed to the shaft 43 in the direction orthogonal to the axis of the shaft 43. The circular conical inner surface 49 is brought into close contact with the first circular conical surface 44, so that further movement is locked also in the direction along the axis of the shaft 43. That is, the first unit 41 and the second unit 42 are locked in both the direction along the axis of the shaft 43, and the direction orthogonal to the axis, and the truck 2 is firmly locked to the floor surface F in an accurately positioned state.

In this case, the shape of the first circular conical surface 44 of the first unit 41, and the shape of the circular conical inner surface 49 of the second unit 42 are complementary to each other, and therefore both the surfaces are brought into surface contact with each other, so that the first unit 41 and the second unit 42 can be uniquely positioned.

Thus, according to the movable robot 1, and the fixing apparatus 4 for the movable robot 1 according to this embodiment, the movable robot 1 can be firmly fixed to the floor surface F as the external structure at a target position with accuracy. As a result, the robot main body 3 can accurately perform work at the target position without correcting the previously taught program. That is, there is an advantage capable of promptly operating the robot main body 3 at each of destinations of the truck 2, and efficiently performing work. Additionally, the robot main body 3 is firmly fixed to the floor surface F as the external structure, and therefore there is an advantage capable of preventing fall of the robot main body 3 also when the robot main body 3 is operated.

The plungers 52 of the clamp mechanism 50 are operated by the normal closed circuit, and therefore even when the driving source 32 is suddenly interrupted, there is an advantage capable of preventing release of a clamp state by the clamp mechanism 50.

In this embodiment, the floor surface F is exemplified as the external structure. However, in place of this, the first unit 41 may be provided in an external structure other than the floor surface F. The case where the shaft 43 is fixed to the floor surface F as the external structure, and the bracket 48 having the inner hole 48a is fixed to the truck 2 is exemplified. However, an opposite case may be employed.

The case where the clamp mechanism 50 has the plungers 52 that radially drive the engagement pieces 51 is exemplified. However, in place of this, the first unit 41 may be absorbed by magnetic attraction force by an electromagnet provided in the second unit 42, so that the first circular conical surface 44 and the circular conical inner surface 49 may be brought into close contact with each other. The inside of the inner hole 48a of the second unit 42 is sucked to be decompressed, so that the first unit 41 may be absorbed in the second unit 42.

Figure 7:
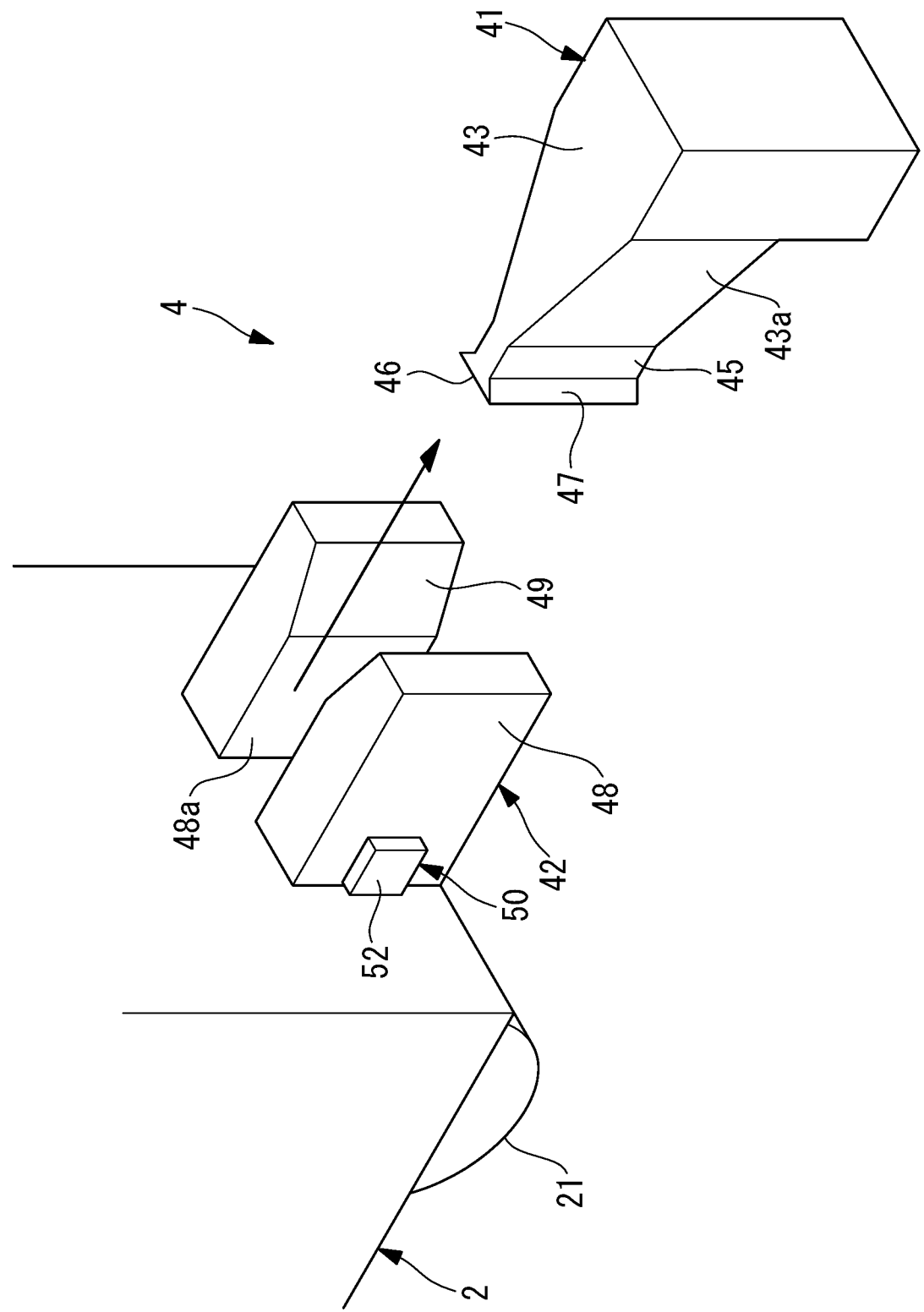
FIG. 7 is a partially perspective view illustrating a modification of the fixing apparatus of FIG. 2.
Figure 8:
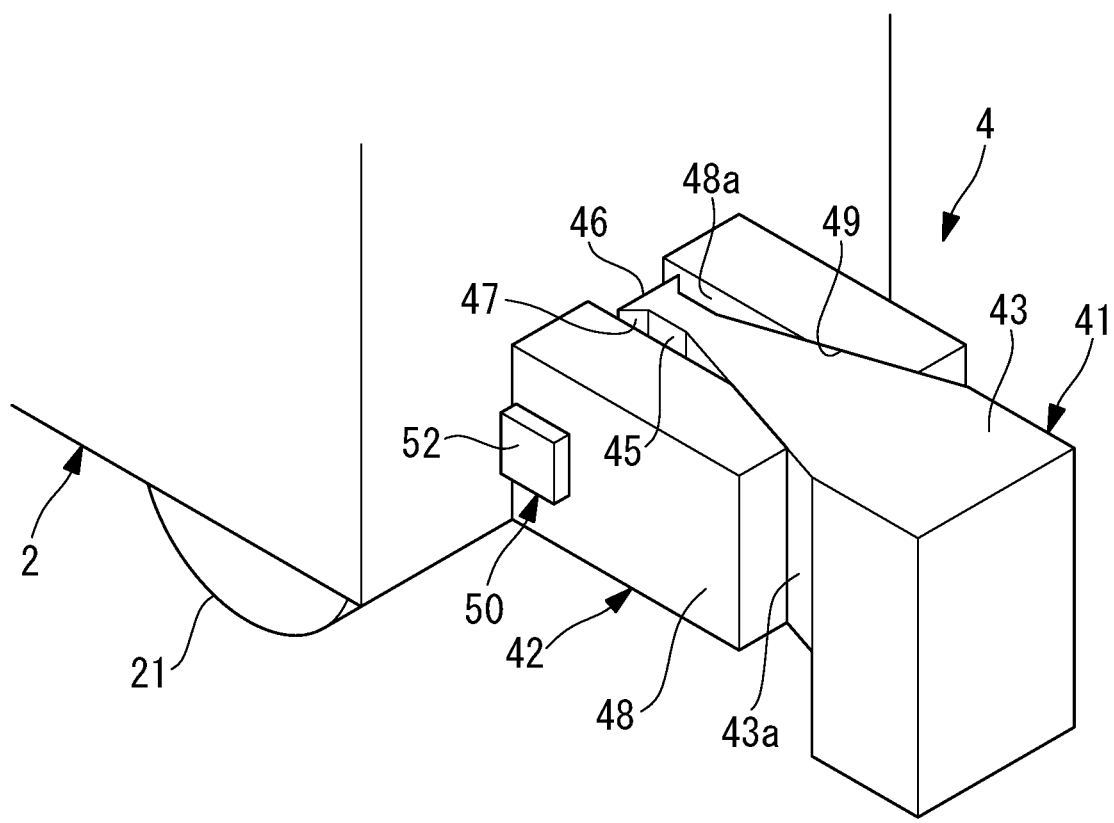
FIG. 8 is a partially perspective view illustrating a fixed state in which tilted planes of the first unit are brought into close contact with tilted planes of the second unit from the state of FIG. 7.

In this embodiment, the tilted planes tilted in the reverse direction at the same angle on the both sides with the axis of the shaft 43 interposed therebetween are composed by the first circular conical surface 44. In place of this, as illustrated in FIG. 7 and FIG. 8, tilted planes 43a composed of a pair of plane surfaces tilted in the reverse direction at the same angle on both sides with an axis of a shaft 43 horizontally interposed therebetween may be employed. Similarly, the second circular conical surface 47 of the disk-like part 46 may be tilted planes composed of a pair of plane surfaces tilted in the reverse direction at the same angle on both sides with the axis of the shaft 43 horizontally interposed therebetween. Thus, positioning in the vertical direction is almost performed by the wheels 21 of the truck 2, and therefore only positioning in the horizontal direction can be firmly performed with accuracy. Although not illustrated, a clamp mechanism 50, an engagement pieces 51, and plungers 52 are provided also in FIG. 7 and FIG. 8.

Figure 9:
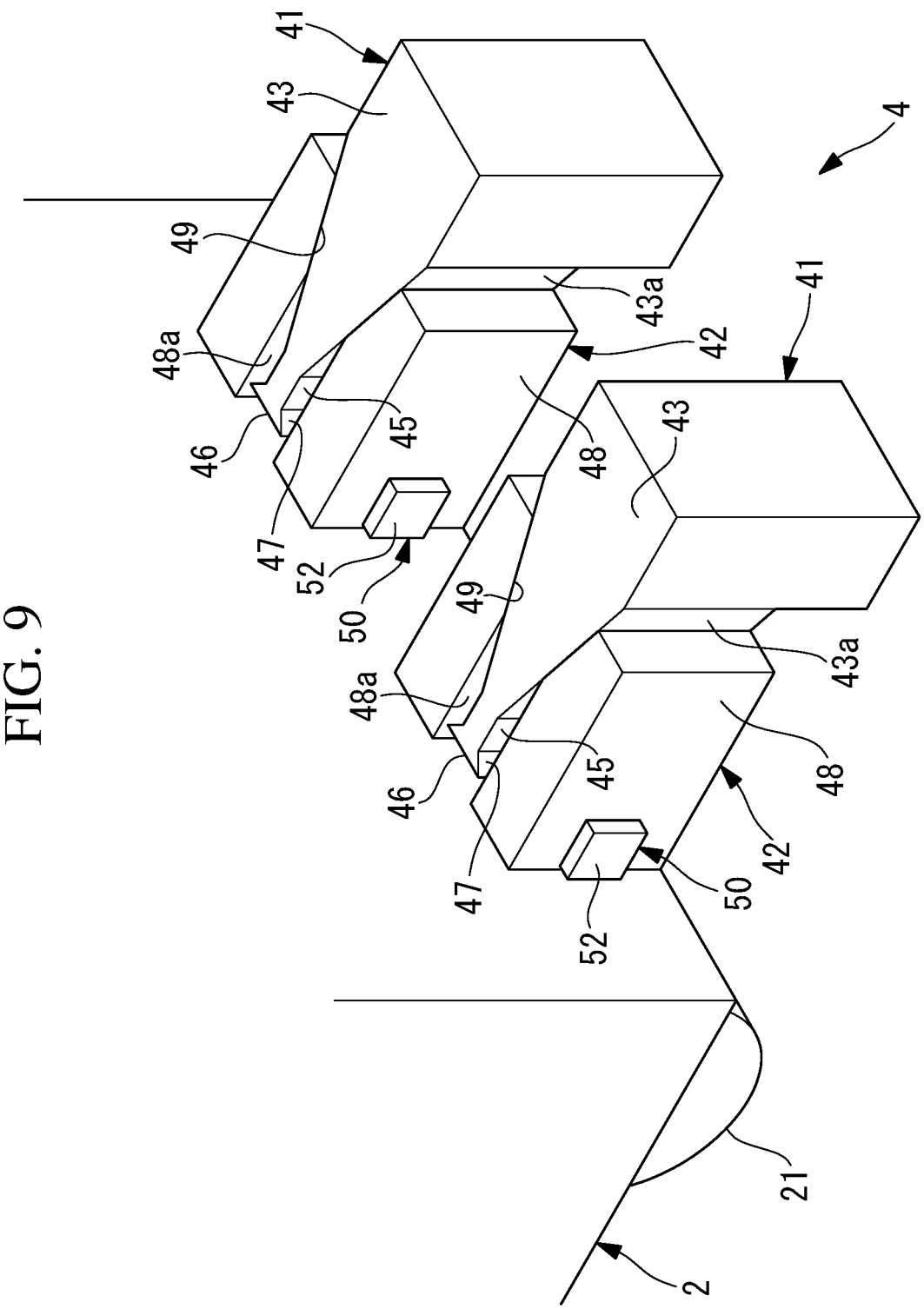
FIG. 9 is a partially perspective view illustrating a modification of the fixing apparatus of FIG. 7.

In this embodiment, the case where the single first unit 41 and the single second unit 42 are provided is exemplified. However, as illustrated in FIG. 9, two or more first units 41, and two or more second units 42 disposed along parallel two or more axes may be mutually fixed. Consequently, it is possible to more accurately perform fixing in a positioning state.

Figure 10:
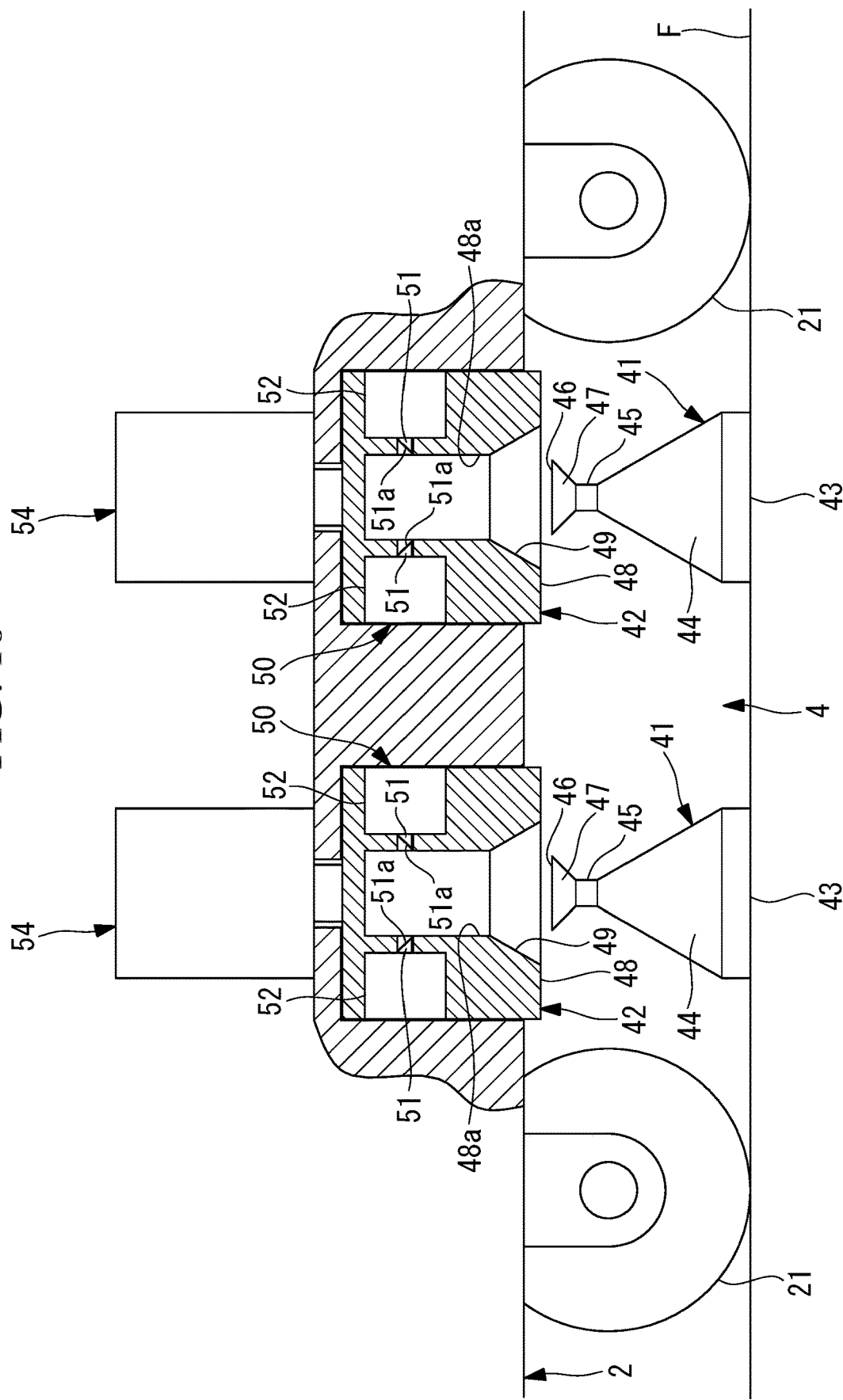
FIG. 10 is a partially longitudinal sectional view illustrating the modification of the fixing apparatus of FIG. 2.
Figure 11:
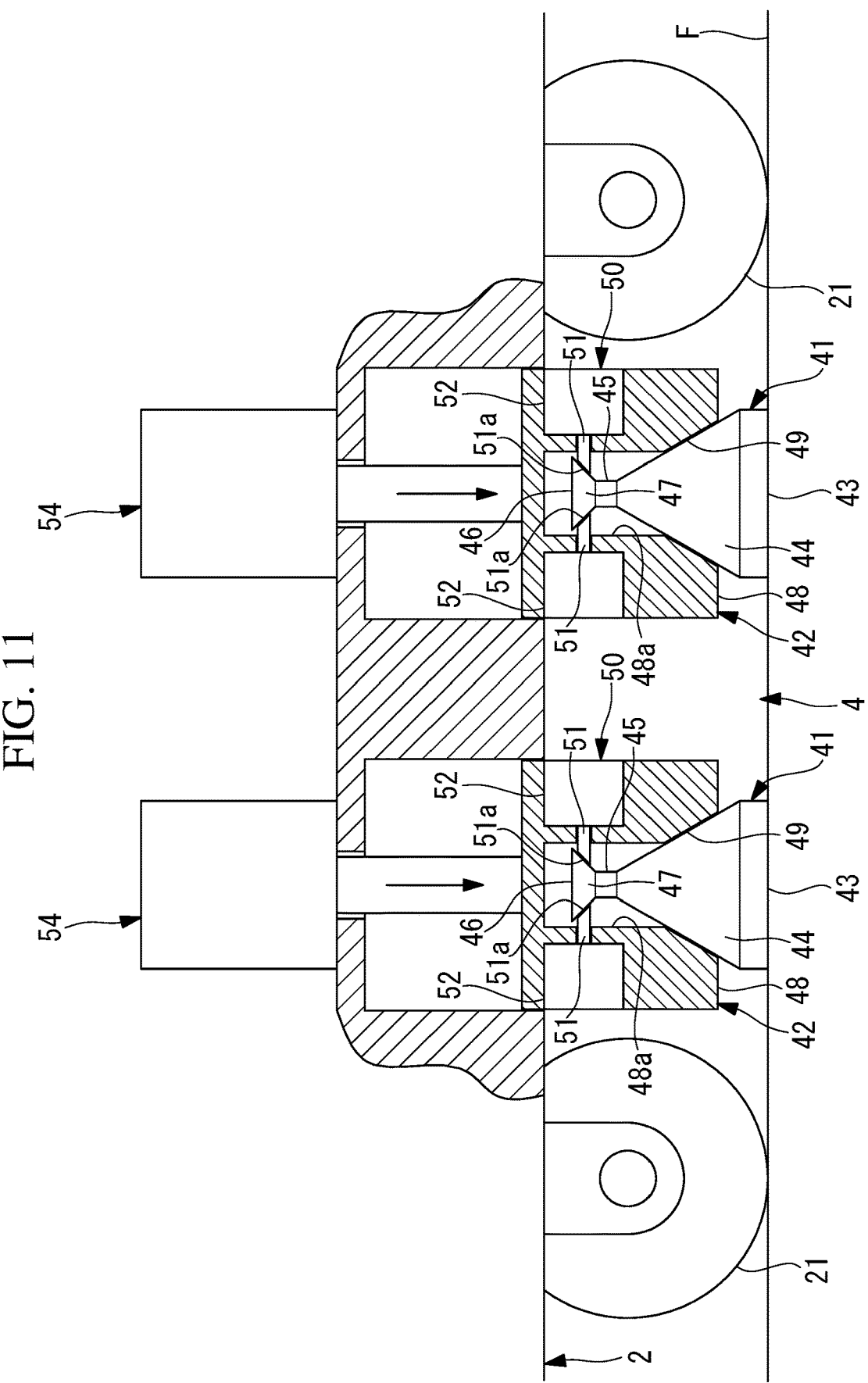
FIG. 11 is a partially longitudinal sectional view illustrating a state in which a bracket is lowered from the state of FIG. 10, and the clamp mechanism is further operated, and the first circular conical surface and the circular conical inner surface are brought into close contact with each other.

In this embodiment, the case where the first circular conical surface 44 of the shaft 43 horizontally disposed in a cantilever state, and the circular conical inner surface 49 of the inner hole 48a of the bracket 48 disposed on the front surface of the truck 2 are brought into close contact with each other is exemplified. In place of this, as illustrated in FIG. 10 and FIG. 11, a component including a first circular conical surface 44 tapered vertically upward from the floor surface F may be employed as the shaft 43 of the first unit 41. As the bracket 48 of the second unit 42, a component that has an inner hole 48a opened downward, and advances or retreats in the vertical direction from a bottom surface of the truck 2 may be employed. In the drawings, reference numeral 54 denotes a lift mechanism that lifts and lowers the bracket 48 in the vertical direction.

Figure 12:
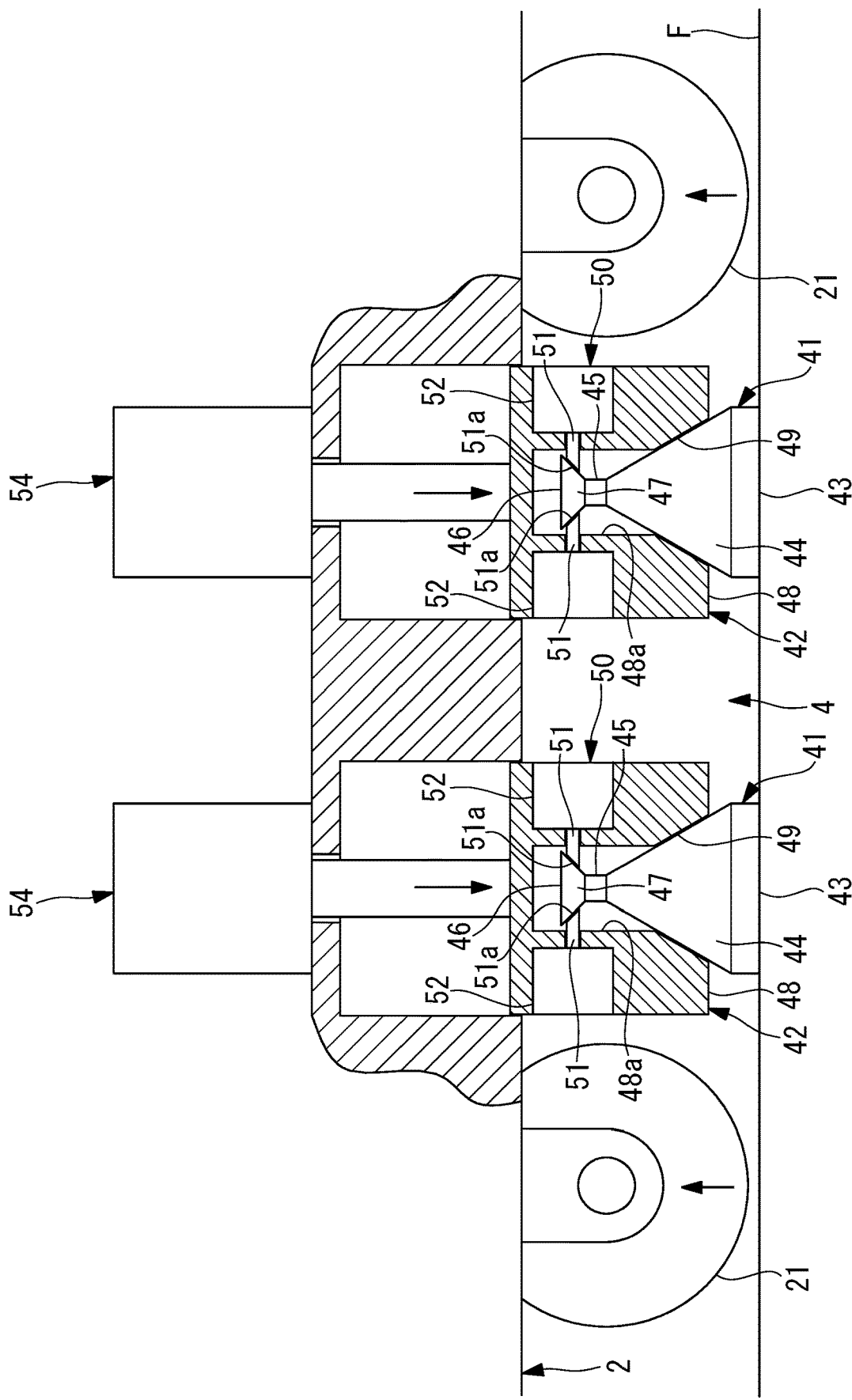
FIG. 12 is a partially longitudinal sectional view illustrating a fixed state in which the bracket is further lowered from the state of FIG. 11, and wheels are floated from a floor surface.
Figure 13:
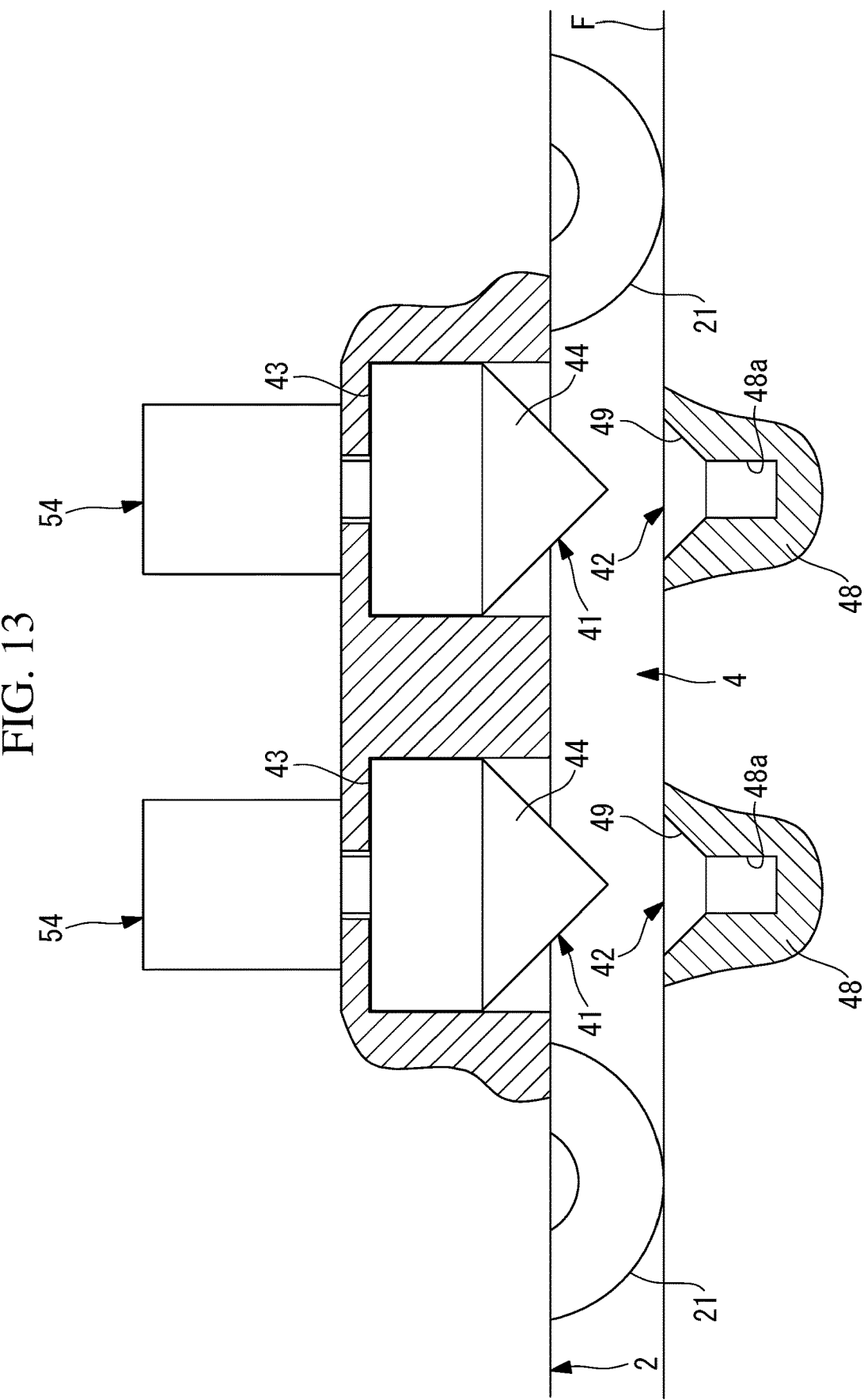
FIG. 13 is a partially longitudinal sectional view illustrating a modification of the fixing apparatus of FIG. 10.
Figure 14:
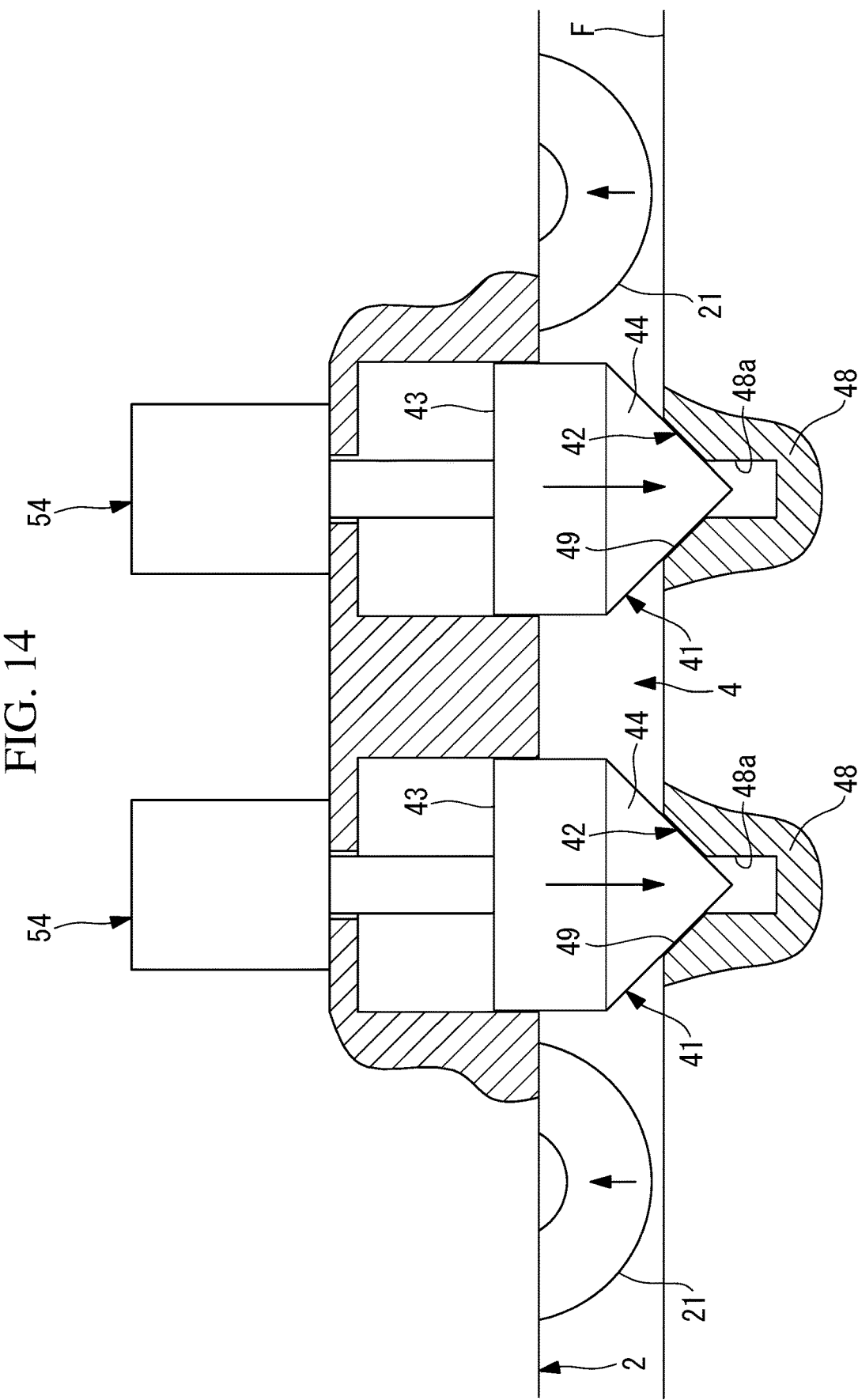
FIG. 14 is a partially longitudinal sectional view illustrating a state in which the shaft is lowered from the state of FIG. 13, and the first circular conical surface and the circular conical inner surface are brought into close contact with each other.

In this case, three or more first unit 41, and three or more second units 42 are preferably provided at intervals in the horizontal direction, brackets 48 are preferably lowered, circular conical inner surfaces 49 are preferably brought into close contact with first circular conical surfaces 44, and thereafter the brackets 48 are preferably further pressed down, as illustrated in FIG. 12. Thus, wheels 21 can be floated from a floor surface F, and a truck 2 can be stably supported by three or more portions, and the truck 2 can be positioned also in the vertical direction. In this case, as illustrated in FIG. 13 and FIG. 14, shafts 43 and brackets 48 may be replaced, the shafts 43 and inner holes 48a may be disposed on a truck 2 side and a floor surface F side, respectively.

In this case, electromagnets (not illustrated) may be provided in the shafts 43 on the truck 2 side, magnetic materials (not illustrated) may be provided in the brackets 48 on the floor surface F side, magnetic force may be generated in the electromagnets on the basis of a signal from a controller 31 with operation of a lift mechanism 54, and the first circular conical surfaces 44 of the shafts 43, and the circular conical inner surfaces 49 of the inner holes 48a of the brackets 48 may be fixed in a close contact state. Magnetic materials may be provided in the shafts 43 on the truck 2 side, electromagnets may be provided in the brackets 48 on the floor surface F side. In this case, magnetic force is generated in the electromagnets on the floor surface F side on the basis of a signal from a controller 31 with operation of a lift mechanism 54, and the shafts 43 and the brackets 48 are fixed to each other.

In the aforementioned embodiment, the fixing apparatus 4, and the movable robot 1 provided with the fixing apparatus 4 are described. However, the present disclosure can be conceptual as a movable robot system 100 including a movable robot 1 and a fixing apparatus 4.

That is, in each of the aforementioned embodiments, the movable robot 1 includes the clamp mechanism 50, and the clamp mechanism 50 is operated by the driving source 32 mounted in the truck 2. In place of this, as illustrated in FIG. 15, a driving source 32, a proximity sensor 33, and a clamp mechanism 50 may be provided on an external structure X side, and in a case where proximity between a first unit 41 and a second unit 42 is detected by a proximity sensor 33, a clamp mechanism 50 may be operated on an external structure X side, and a first circular conical surface 44 and a circular conical inner surface 49 may be brought into close contact with each other.

Figure 15:
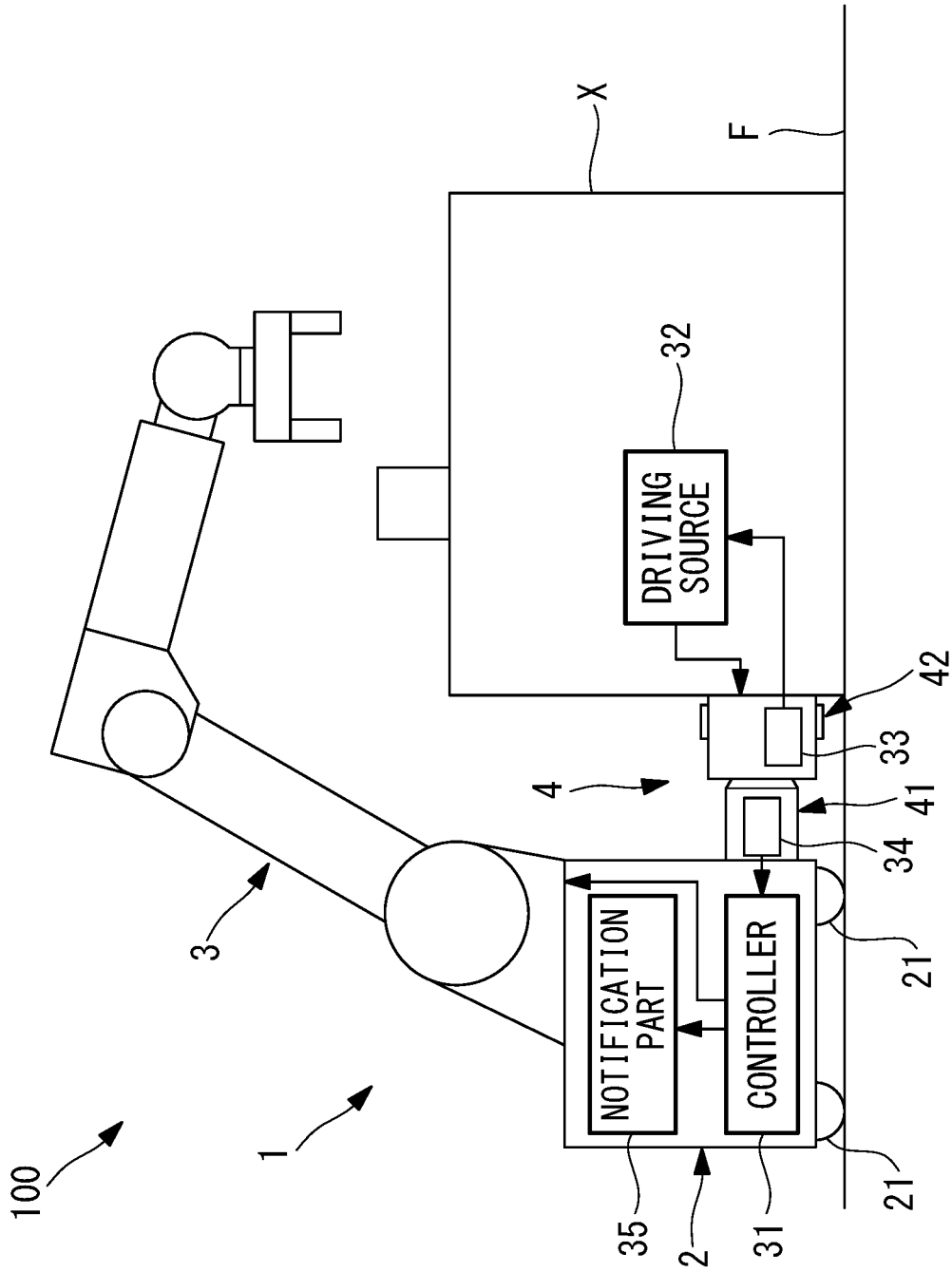
FIG. 15 is a schematic diagram illustrating a movable robot system according to a position embodiment of the present disclosure.

Furthermore, as illustrated in FIG. 15, a sensor 34 that detects close contact between a first circular conical surface 44 and a circular conical inner surface 49, and a notification part 35 that notifies that the sensor 34 detects the close contact in a case where the sensor 34 detects the close contact may be provided. An arbitrary sensor such as a switch that detects operation of the engagement pieces 51 of the clamp mechanism 50, a contact switch that is pressed by the first circular conical surface 44 or the circular conical inner surface 49 to switch ON/OFF, a noncontact proximity switch, a sensor that detects close contact by change of contact resistance between both, or pressure change can be used as the sensor 34.

An arbitrary means such as a buzzer or a speaker that performs notification by voice, a lamp or a rotary light that performs notification by light, a monitor that performs notification by screen display, vibrator that performs notification by vibration can be employed as the notification part 35. The sensor 34 and the notification part 35 may be provided on either the movable robot 1 side or the external structure X side.

The sensor 34 may be provided on the movable robot 1 side, output from the sensor 34 may be transmitted to the controller 31, and the controller 31 may be able to operate the movable robot 1 only in a case where the sensor 34 detects close contact between the first circular conical surface 44 and the circular conical inner surface 49. Consequently, the robot main body 3 can be prevented from operating in a state in which the truck 2 is not fixed. The lock mechanism may be able to perform transitional movement in at least the uniaxial direction, or may be able to perform rotational movement in at least the uniaxial rotation direction. The truck 2 capable of traveling on a floor surface may be a self-traveling truck (for example, an AGV), or a hand carriage.

The invention claimed is:

1. A fixing apparatus that fixes a robot having a robot main body mounted on a truck to an external structure in a positioning state, the truck capable of traveling on a floor surface, the apparatus comprising:

a first unit provided in one of the robot and the external structure;

a second unit provided in the robot or the external structure where the first unit is not provided; and a lock mechanism that locks the truck and the robot, and the external structure, wherein the first unit includes a first pair of tilted planes and a second pair of tilted planes, each of which are tilted in a reverse direction at a same angle on both sides with at least one axis extending in a predetermined direction interposed therebetween, the second unit includes a close contact surface having a complementary shape enabling close contact to the first pair of tilted planes, and the lock mechanism applies force to the second pair of tilted planes in a direction orthogonal to the at least one axis so that the first pair of tilted planes are drawn toward the close contact surface until the first pair of tilted planes are pressed against the close contact surface.

2. The fixing apparatus according to claim 1, wherein
the at least one axis comprises two or more axes disposed in parallel at an interval in a horizontal direction, and
the first pair of tilted planes and the second pair of tilted planes are provided with respect to each of the axes.

3. The fixing apparatus according to claim 2, wherein
the axes extend along the horizontal direction, and
each of the first pair of tilted planes and the second pair of tilted planes are disposed on both sides with each of the axes horizontally interposed therebetween.

4. The fixing apparatus according to claim 2, wherein
the external structure is the floor surface,
the first unit includes three shafts formed to be tapered toward a vertical direction,
each of the axes is a central axis of each of the shafts,
the first pair of tilted planes are a conical surface with the central axis of each of the shafts as a center, and
the close contact surface is an inner surface of a hole that enables a tip of each of the shafts to be inserted therein.

5. The fixing apparatus according to claim 1, wherein
the first pair of tilted planes and the second pair of tilted planes are a conical surface with the axis as a central axis.

6. The fixing apparatus according to claim 5, wherein
the conical surface is a circular conical surface.

7. The fixing apparatus according to claim 1, wherein
the lock mechanism is driven by power supplied from a driving source, and
when the power supplied from the driving source is stopped, a state in stop is kept.

8. A robot comprising:
a truck capable of traveling on a floor surface;
a robot main body mounted on the truck; and
a fixing mechanism that is provided in the truck, and fixes the truck to an external structure in a positioning state, wherein
a first pair of tilted planes and a second pair of tilted planes are provided in the external structure, each of the first pair of tilted planes and the second pair of tilted planes being tilted in a reverse direction at the same angle on both sides with at least one axis extending in a predetermined direction interposed therebetween
the fixing mechanism includes a close contact surface having a complementary shape enabling close contact to the first pair of tilted planes, and a pressing mechanism, and
the pressing mechanism applies force to the second pair of tilted planes in a direction orthogonal to the at least one axis so that the first pair of tilted planes are drawn toward the close contact surface until the first pair of tilted planes are pressed against the close contact surface.

9. The robot according to claim 8, wherein
the at least one axis comprises two or more axes disposed in parallel at an interval in a horizontal direction, and
the first pair of tilted planes and the second pair of tilted planes are provided with respect to each of the axes.

10. The robot according to claim 9, wherein
the axes extend along the horizontal direction, and
each of the first pair of tilted planes and the second pair of tilted pair are disposed on both sides with each of the axes horizontally interposed therebetween.

11. The robot according to claim 8, wherein
the first pair of tilted planes and the second pair of tilted planes are a conical surface with the axis as a central axis.

12. The robot according to claim 11, wherein
the conical surface is a circular conical surface.

13. The robot according to claim 8, wherein
the external structure is the floor surface,
one of the first pair of tilted planes and the close contact surface is a conical surface with a central axis of each of three shafts formed to be tapered toward a vertical direction as a center, and
the other of the first pair of tilted planes and the close contact surface is an inner surface of a hole that enables a tip of each of the shafts to be inserted therein.

14. A robot system comprising:
a fixing apparatus that fixes a robot having a robot main body mounted on a truck to an external structure in a positioning state, the truck capable of traveling on a floor surface; and
the robot, wherein
the fixing apparatus comprises:
a first unit provided in one of the robot and the external structure;
a second unit provided in the robot or the external structure where the first unit is not provided; and
a lock mechanism that locks the truck and the robot, and the external structure,
the first unit includes a first pair of tilted planes and a second pair of tilted planes each of which are tilted in a reverse direction at the same angle on both sides with at least one axis extending in a predetermined direction interposed therebetween,
the second unit includes a close contact surface having a complementary shape enabling close contact to the first pair of tilted planes, and
the lock mechanism applies force to the second pair of tilted planes in a direction orthogonal to the at least one axis so that the first pair of tilted planes are drawn toward the close contact surface until the first pair of tilted planes are pressed against the close contact surface.

15. The robot system according to claim 14, further comprising:
a sensor that detects whether or not the robot is fixed to the external structure; and
a notification part that notifies fixing of the robot to the external structure in response to a detection of the fixing by the sensor.

16. The robot system according to claim 14, further comprising:
a sensor that detects whether or not the robot is fixed to the external structure; and
a controller that controls the robot, wherein the controller causes the robot to be able to drive in response to a detection of fixing of the robot to the external structure by the sensor.

\* \* \* \* \*